United States Patent
Lowe et al.

[19]

[11] Patent Number: 6,091,405
[45] Date of Patent: Jul. 18, 2000

[54] INPUT DEVICE

[75] Inventors: Anthony Cyril Lowe, Ayrshire; Christopher C. Pietrzak, Winchester, both of United Kingdom

[73] Assignee: International Business Machines Corporation, Armonk, N.Y.

[21] Appl. No.: 08/287,070

[22] Filed: Aug. 8, 1994

Related U.S. Application Data

[63] Continuation of application No. 08/085,512, Jun. 30, 1993, abandoned.

[30] Foreign Application Priority Data

Jun. 30, 1992 [GB] United Kingdom .................... 9213913

[51] Int. Cl.[7] ........................................................ G09G 5/00
[52] U.S. Cl. .......................................... 345/175; 178/18.09
[58] Field of Search .................................. 178/18, 18.09; 345/175; 250/221, 222.1, 229, 238; 356/375; 341/13, 5; 364/477; 395/94

[56] References Cited

U.S. PATENT DOCUMENTS

| | | | |
|---|---|---|---|
| 3,613,066 | 10/1971 | Cooreman | 178/18 X |
| 3,925,666 | 12/1975 | Allan et al. | 250/221 X |
| 3,944,818 | 3/1976 | Bechtel | 250/221 |
| 4,558,313 | 12/1985 | Garwin et al. | 340/790 |
| 4,708,473 | 11/1987 | Metzdorff et al. | 356/375 X |
| 5,001,557 | 3/1991 | Begle | 250/221 X |
| 5,159,187 | 10/1992 | Okisu et al. | 250/221 X |
| 5,173,793 | 12/1992 | Purcell . | |

FOREIGN PATENT DOCUMENTS

| | | | |
|---|---|---|---|
| 0301715A1 | 2/1989 | European Pat. Off. . | |
| 0366112A3 | 5/1990 | European Pat. Off. . | |
| 2166831 | 5/1986 | United Kingdom | 250/221 |

*Primary Examiner*—Amare Mengistu
*Attorney, Agent, or Firm*—James M. Leas

[57] ABSTRACT

An input device for a visual display comprising a light source and a scanner for angularly scanning a light beam from the light source across a plane. A photodetector detects interruption of the beam by an article positioned in the plane. The scanner comprises a shutter having a linear array of addressable, electrically actuable shutter elements. Each element is operable to transmit or block light from the light source under the control of a corresponding electrical signal. Because the light beam is scanned by a shutter rather than a mechanical scanner, the device is advantageously more reliable than conventional electromechanical optical input devices.

27 Claims, 3 Drawing Sheets

INPUT DEVICE

This is a continuation of application Ser. No. 08/085,512 filed on Jun. 30, 1993 is now abandoned.

FIELD OF THE INVENTION

The present invention relates to an input device for a visual display screen.

BACKGROUND OF THE INVENTION

Input devices for visual display screens are particularly useful in cluttered computing environments where conventional data entry devices such as keyboards and mice are impractical because they occupy valuable working space.

U.S. Pat. No. 4,558,313 describes an example of a conventional electromechanical optical input device in which first and second light beams are scanned across a plane display screen by mechanical rotating beam scanners. The first light beam is scanned from one side of the screen and the second light beam is scanned from the other side. To operate the touch screen, an operator places a stylus at a desired location on the screen. The stylus interrupts portions of the light beams that would otherwise be reflected back towards their respective sources by retroreflective strips. In response to detection of the reflected portions at the sources, via photodetectors, the location of the stylus is determined from the respective angular positions of the two light beams incident on the stylus.

SUMMARY OF THE INVENTION

In accordance with the present invention, there is now provided an input device for a visual display, the device comprising: a light source; a scanner for angularly scanning a light beam from the light source across a plane; and a photodetector for detecting interruption of the beam by an article positioned in the plane; characterized in that the scanner comprises a shutter having a linear array of addressable, electrically actuable, shutter elements, each element being individually operable to transmit or block light from the light source under the control of a corresponding electrical signal.

Because the light beam is scanned by a shutter rather than a mechanical scanner, an input device of the present invention is advantageously more reliable than conventional electromechanical optical input devices.

The device preferably comprises a processor for determining the position of the article in response to the photodetector detecting the presence of the article and as a function of the address or addresses in the array of the element or elements transmitting the interrupted beam or beams.

Because there is no inertia associated with the shutter, an input device of the present invention can advantageously track any motion of the article at higher speeds than conventional electromechanical optical input devices.

In a preferred embodiment of the present invention, the processor is adapted to track the position of the article in the approximate plane by actuating only elements of the array transmitting interrupted beams. This advantageously permits still faster tracking of the stylus and furthermore enables the input device to be serviced by less processing power.

The scanner may, for convenience and simplicity, comprise a diverging lens for generating a diverging envelope of light beams from light generated by the light source.

The scanner may comprise a mirror for directing the diverging envelope of rays towards the shutter. The mirror advantageously reduces the space required for implementing the present invention.

The light source preferably comprises a condenser for producing a substantially collimated light beam. This advantageously improves the sensitivity of the present invention by increasing the intensity of the light beam detected by the photodetector.

Preferably, the light source is driven by a pulse signal to generate pulses of light. This advantageously provides a further improvement in the intensity of the light beam detected at the photodetector.

The photodetector is preferably phase-locked to the pulse signal to advantageously improve the signal to noise ratio of the photodetector.

Preferably, the photodetector comprises a bandpass filter adapted to substantially prevent the photodetector from detecting light of wavelengths that are not generated by the light source. This advantageously provides a further improvement in the signal to noise ratio of the photodetector.

It will be appreciated that the present invention extends to a display device, such as for example a liquid crystal display or a CRT display, comprising an input device as hereinbefore described.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
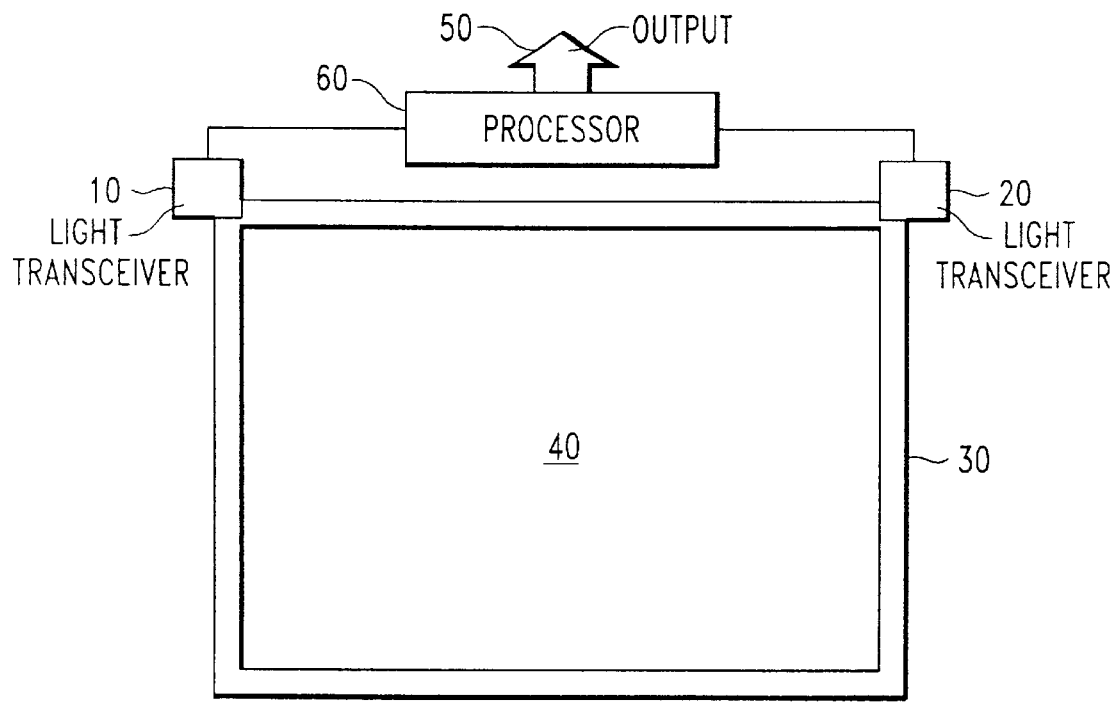
FIG. 1 is a block diagram of an input device of the present invention.

Referring first to FIG. 1, an example of an input device of the present invention comprises two light transceivers 10,20 mounted on opposite sides of bezel 30 that can be releasably secured to screen 40 of a visual display (not shown). Transceivers 10,20 receive electrical control signals from, and transmit electrical output signals to, processor 60. Processor 60 has digital output 50 that may be connected to an input/output adaptor such as a mouse part of a host computer system such as a personal computer (not shown).

Figure 2:
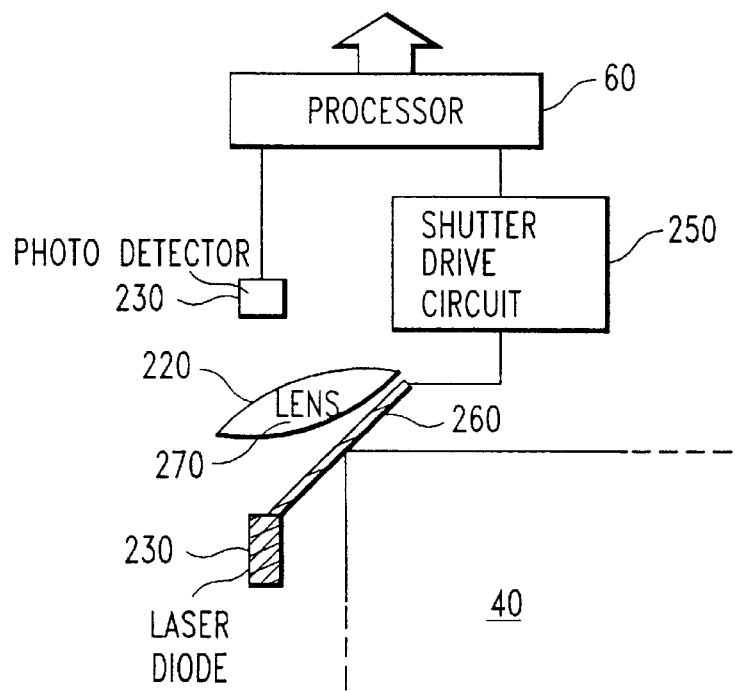
FIG. 2 is a block diagram of a transceiver for the input device.

Referring now to FIG. 2, each transceiver 10,20 comprises a light source in the form of laser diode 210 directed towards cylindrical lens 270. The face of lens 270 remote from laser diode 210 is silvered with semireflective mirror 220. Mirror 220 is directed towards linear array liquid crystal shutter 260 having N addressable elements 300a–300n. Shutter 260 may be manufactured from Ferroelectric Smectic LC material or from Stacked Nematic Pi Cells. Elements 300a–300n are electrically configured by drive signals from shutter driver circuit 250 to either permit or block passage of light. Shutter driver circuit 260 receives control signals from processor 60. Photodetector 230 is located behind mirror 220. The output of photodetector 230 is connected to processor 60. Lens 270 is shaped to direct the divergent envelope of rays from laser diode 210 towards mirror 220 and to focus rays directed from shutter 260 towards mirror 220 onto photodetector 230. It will be appreciated however that, in other embodiments of the present invention, single cylindrical lens 270 may be replaced by separate diverging and converging lenses.

Figure 3:
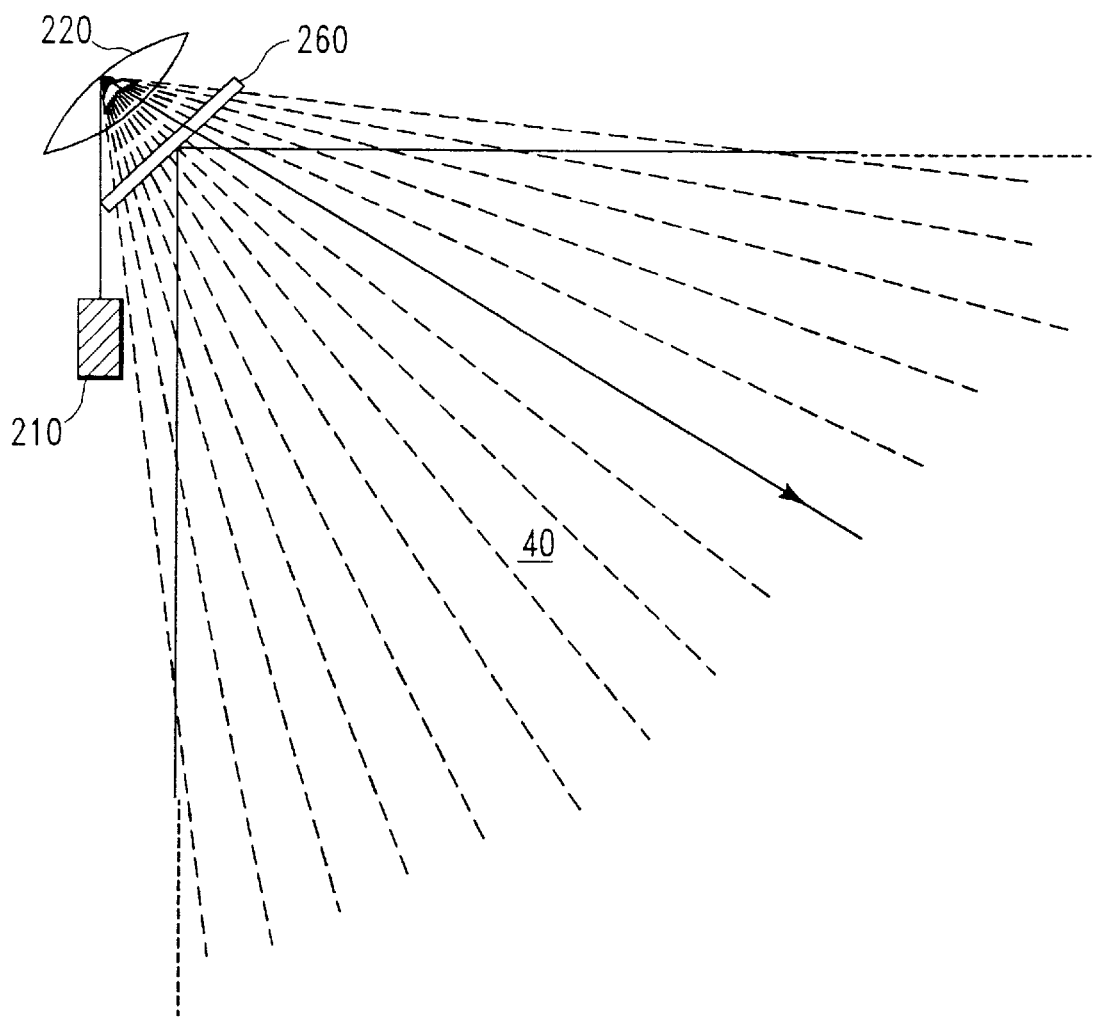
FIG. 3 is a block diagram of the transceiver in operation.
Figure 4:
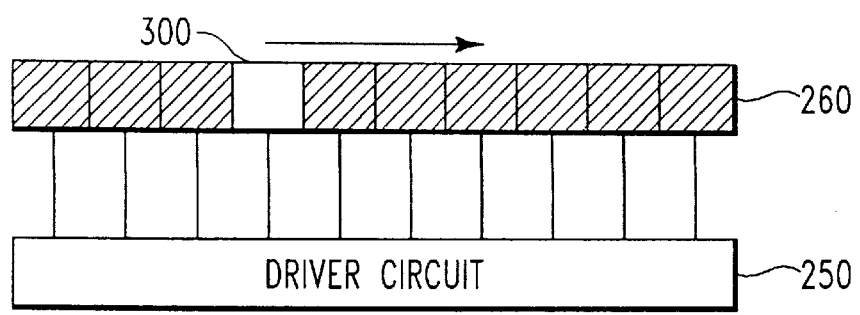
FIG. 4 is a block diagram of a liquid crystal shutter for the transceiver.

Referring to FIG. 3, in each transceiver, lens 220 converts a light beam generated by laser diode 210 into a divergent envelope of rays that substantially fills mirror 220. Mirror 220 partially reflects the envelope to generate a divergent fan of rays that would extend, in the absence of shutter 260, to substantially cover the area of screen 40 in a 90 degree arc. However, as illustrated in FIGS. 3 and 4, driver circuit 250 configures elements of shutter 260 in such a manner that, at any instant in time, one of the elements 300 is transparent to the rays and the remaining elements are opaque. Thus, at any instant in time, only one ray of the fan is permitted to extend across screen 40.

With reference to FIG. 4, driver circuit 250 generates drive signals arranged to progressively move transparent element 300 along shutter 260 from one end to the other. Thus, in operation, shutter 260 acts like a moving slit with each element 300 in turn admitting a different ray of the fan. A beam of light is thereby effectively scanned across screen 40. Each element remains transparent for a matter of microseconds. For the purpose of explanation, the shutter is depicted in FIG. 4 as having ten elements. In practice however, to achieve acceptable sensitivity, the shutter may have more than a hundred elements.

Figure 5:
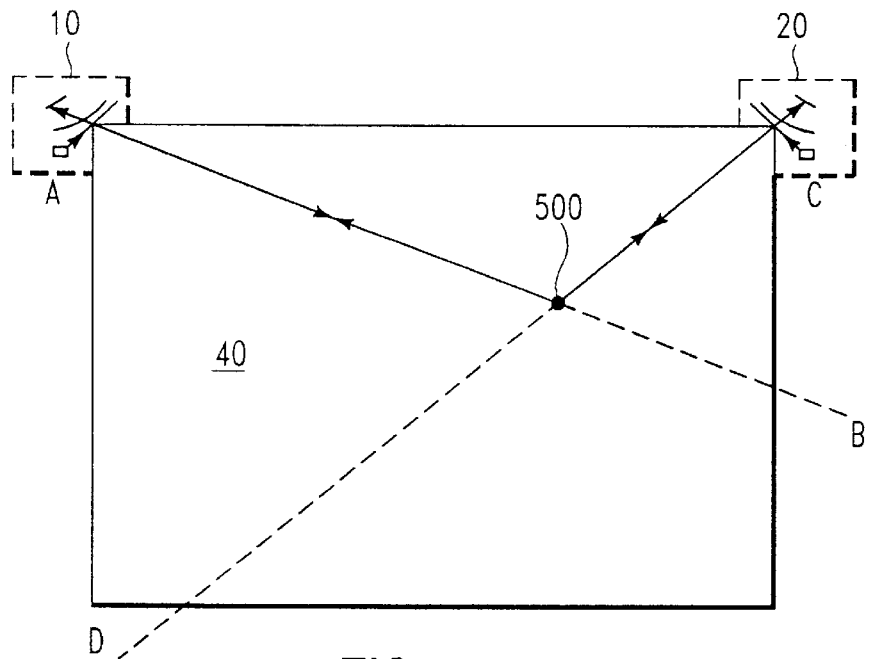
FIG. 5 is a block diagram of the input device in operation.

Turning now to FIG. 5, to operate a touch sensitive input device of the present invention, an operator positions retroreflective stylus 500 at a desired location on screen 40. Portions of the light beams incident on stylus 500 are reflected back towards their respective sources 10,20. At each transceiver 10,20, the reflected portion passes through transparent element 300 of shutter 260 towards lens 270. A fraction of the reflected portion passes through mirror 220 to be focused by lens 270 onto photodetector 230. This produces a change in the output of photodetector 230. The change in the output triggers processor 60 to read the address in shutter 260 of transparent element 300. Processor 60 determines the angular position of the incident ray from the address of transparent element 300. The position of the stylus on screen 40 is identified by the intersection x of incident rays, AB and CD, from two transceivers 10,20. Processor 60 determines the intersection from the angular positions of the incident rays with respect to a common datum.

Because the rays extending across the screen are divergent, stylus 500 may be detected through several elements of shutter 260. The position of stylus 500 may therefore be determined by convolution of the angular positions. When processor 60 detects the presence of the stylus through more than one element of one or both of the shutters, only those elements, together with enough on either side of them to permit limited overscanning, are addressed. Any motion of the stylus can therefore be detected at higher speed than previously possible. This advantageously permits faster tracking of the stylus and enables the touch screen to be serviced by less processing power.

It will be appreciated that the light generated by light source 210 may be of a wavelength or wavelengths within the visible region or invisible regions of the Electromagnetic Spectrum.

Figure 6:
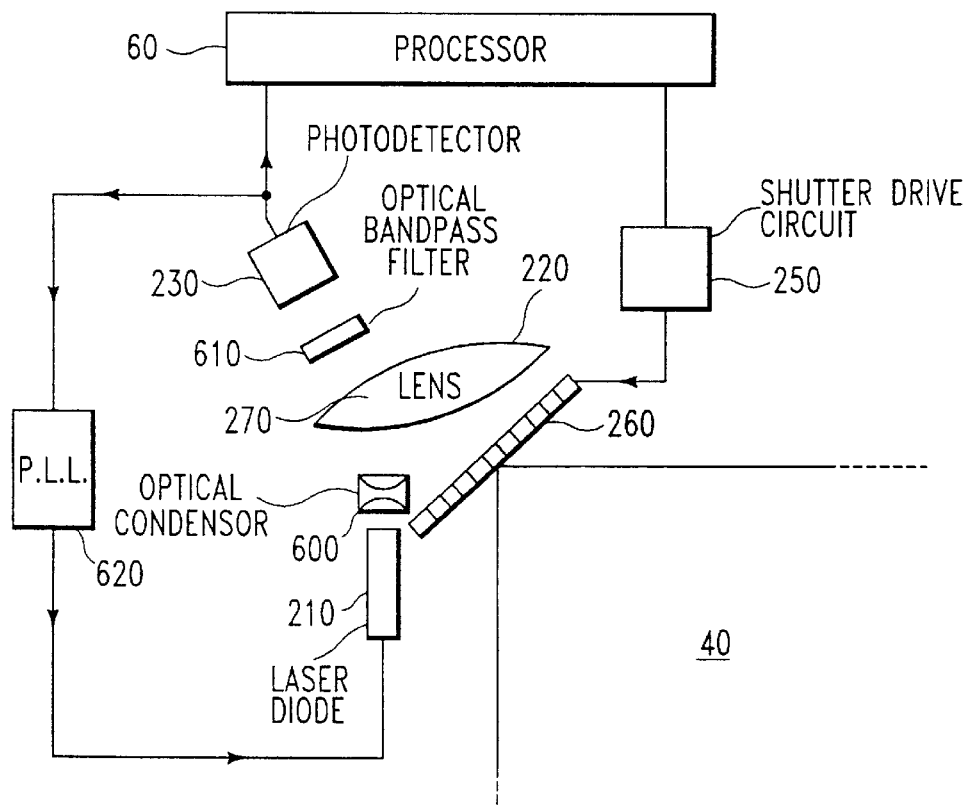
FIG. 6 is a block diagram of another transceiver for the touch sensitive input device.

Referring now to FIGS. 1 and 6, in a preferred example of the present invention, bezel 30 carrying transducers 10,20 has a diagonal length of 356 mm. In both transceivers 10,20, the light beam generated by laser diode 210 is collimated to a diameter of approximately 2 mm by an optical condenser 600 having an optical efficiency of about 40%. Liquid crystal shutter 260 is about 70% efficient and has first and second polarizer efficiencies of around 40% and 80% respectively. The optical efficiencies of mirror 220 and lens 270 are around 70% and 80% respectively. Mirror 220 has both reflection and transmission efficiencies of approximately 45%. Lens 270 is shaped to diverge the light beam from laser diode 210 across approximately 90 degree arc. The long pulsed mean power emission from laser diode 210 is of the order of 5 mW/steradian and diode output power efficiency is 5%. However, in operation, laser diode 210 is actuated by 100 us pulses at duty cycle of 100 us to produce a mean power emission of about 50 mw/steradian. The apparatus is operated with a 2 mm diameter stylus 500 reflecting around 50% of an incident beam. Photodetector 230 comprises a phototransistor producing an output current response of about $4.10E-2$ A/W/cm*2 superposed on a dark current of approximately $2.10E-9$ A. Optical bandpass filter 610 located between lens 270 and photodetector 230 removes stray light. The output of photodetector 230 is phase-locked to the pulses actuating laser diode 270 by phase-lock loop circuit 620 to improve the signal to noise ratio.

The optical efficiency of the preferred embodiment of the present invention described in the preceding paragraph is a factor of about 5000 less than that of the aforementioned conventional electromechanical optical touch sensitive input device based on a 2 mm collimated beam.

In operation, the photodetector 230 produces photocurrent of about $1.5 \times 10E-6$ in response to background illumination and about $2.4 \times 10E-7$ in response to an incident ray reflected by the stylus and transmitted by mirror 220. If condenser 600 is omitted, the photocurrent produced by photodetector 230 in response to the incident ray is reduced by a factor of around 20 to $1.2 \times 10E-8$ A. If laser diode 210 is operated continuously instead of pulsed, the photocurrent produced by photodetector 230 in response to the incident beam is reduced by a further factor of about 10 to $1.2 \times 10E-9$ A. In other words, if the condenser is omitted and laser diode 210 is operated continuously, the photocurrent produced by photodetector 230 in response to the incident beam would be reduced to noise level and would therefore be undetectable.

While several embodiments of the invention, together with modifications thereof, have been described in detail herein and illustrated in the accompanying drawings, it will be evident that various further modifications are possible without departing from the scope of the invention. Nothing in the above specification is intendedto limit the invention more narrowly than the appended claims. The examples given are intended only to be illustrative rather than exclusive.

What is claimed is:

1. An input device for a visual display screen, the device comprising a first assembly including:
   a source of diverging light comprising rays directed substantially parallel to the surface of the screen, said rays substantially covering the screen
   a shutter disposed to interrupt a portion of said light before it reaches the screen, said shutter comprising an array of shutter elements, each element having a unique address, further wherein each element has a transparent state in which light from said light source is transmitted and an opaque state in which light from said light source is blocked;

shutter drive circuit means coupled to said shutter elements for controlling the state of each of said shutter elements so as to provide a scanning light beam as an output of said shutter; and a photodetector for detecting interruption of said light beam by an article positioned in the plane and for providing a first output signal upon detecting said interruption of said light beam.

2. A device as recited in claim 1, wherein a single shutter element in said array is in said transparent state at any given time and wherein the location within said array of said single element in said transparent state changes with time.

3. A device as recited in claim 1, further comprising processor means, coupled with said photodetector to receive said first output signal, for determining, upon receipt of said first output signal, the address of said shutter element transmitting an interrupted beam.

4. A device as recited in claim 1, further comprising a second assembly that is identical to said first assembly and is positioned relative to said first assembly so that light beams from said first assembly intersect light beams from said second assembly.

5. A device as recited in claim 4, further comprising processor means, coupled with said first and second assemblies, for determining the address of shutter elements in said first and second assemblies transmitting interrupted beams and for determining the position of said article based on said addresses of said shutter elements.

6. A device as recited in claim 4, wherein said device includes a bezel and said first and second assemblies are located at adjacent corners of said bezel.

7. A device as recited in claim 1, further comprising processor means adapted to track the position of articles substantially in the plane by making transparent only elements of the array transmitting interrupted beams.

8. A device as recited in claim 7, wherein the elements of the array made transparent also include elements on either side of elements of the array transmitting interrupted beams to permit limited overscanning.

9. A device as recited in claim 1, wherein said light source is a laser.

10. A device as recited in claim 1, wherein said means to provide a diverging envelope of rays comprises a diverging lens.

11. A device as recited in claim 1, further comprising a mirror for directing said diverging envelope of rays towards said shutter.

12. A device as recited in claim 1, wherein said light source further comprises a condenser for producing a substantially collimated light beam.

13. A device as recited in claim 1, further comprising a pulse generator coupled with said light source for generating a pulse signal, said light source is driven by said pulse signal so as to generate pulses of light.

14. A device as recited in claim 13, further comprising a phase-locked loop circuit for phase-locking said output of said photodetector to said pulse signal.

15. A device as recited in claim 1, wherein the photodetector comprises a bandpass filter adapted to substantially prevent the photodetector from detecting light of wavelengths that are not generated by the light source.

16. A device as recited in claim 1, wherein the photodetector is positioned to receive light reflected from an article positioned in the plane.

17. A device as recited in claim 16, wherein said article is a retroreflective stylus positioned in the plane.

18. A device as recited in claim 1, wherein said photodetector and said source of diverging light are located at the same corner of a bevel.

19. A scanner for angularly scanning a light beam, said scanner comprising:

a source of diverging light a shutter disposed to interrupt a portion of said light, said shutter comprising an array of shutter elements, each element having a unique address, further wherein each element has a transparent state in which light from said light source is transmitted and an opaque state in which light from said light source is blocked; and shutter drive circuit means coupled to said shutter elements for controlling the state of each of said shutter elements so as to provide a scanning light beam as an output of said shutter.

20. A scanner as recited in claim 19, wherein said array comprises a linear array; and said shutter drive circuit means further comprises address means for sequentially addressing adjacent elements in said array so as to cause said addressed elements to sequentially assume said transparent state, thereby causing light beams from said light source to be scanned.

21. A scanner as recited in claim 19, wherein said array is a linear array.

22. A scanner as recited in claim 19, wherein a single shutter element in said array is in said transparent state at any given time and wherein the location within said array of said single element in said transparent state changes with time.

23. A shutter as recited in claim 22, wherein said shutter drive circuit means further comprises address means for changing a first element in said opaque state to said transparent state at about the time an adjacent second element in said transparent state changes to said opaque state.

24. A shutter as recited in claim 23, wherein said shutter drive circuit means further comprises address means for changing states sequentially in adjacent elements repeatedly in a specified direction along a linear portion of said array, thereby scanning a transmitted beam in said direction.

25. A shutter as recited in claim 19, wherein said array is a linear array, said shutter drive circuit means further comprises address means so only one element of said array of shutter elements is in said transparent state at any time, at about the time a first element in said transparent state changes to said opaque state, an element in said opaque state adjacent said first element changes to said transparent state and states change sequentially in adjacent elements repeatedly in a specified direction along said linear array, thereby scanning a transmitted beam in said direction.

26. A visual display comprising a visual display screen and an input device, said device comprising a first assembly including:

a source of diverging light comprising rays directed substantially parallel to the surface of the screen, said rays substantially covering the screen a shutter disposed to interrupt a portion of said light before it reaches the screen, said shutter comprising an array of shutter elements, each element having a unique address, further wherein each element has a transparent state in which light from said light source is transmitted and an opaque state in which light from said light source is blocked;

shutter drive circuit means coupled to said shutter elements for controlling the state of each of said shutter elements so as to provide a scanning light beam as an output of said shutter; and a photodetector for detecting interruption of said light beam by an article positioned in the plane and for providing a first output signal upon detecting said interruption of said light beam.

27. A system comprising a processor and a visual display, said display comprising a visual display screen and an input device, said device comprising a first assembly including:

- a source of diverging light comprising rays directed substantially parallel to the surface of the screen, said rays substantially covering the screen
- a shutter disposed to interrupt a portion of said light before it reaches the screen, said shutter comprising an array of shutter elements, each element having a unique address, further wherein each element has a transparent state in which light from said light source is transmitted and an opaque state in which light from said light source is blocked;
- shutter drive circuit means coupled to said shutter elements for controlling the state of each of said shutter elements so as to provide a scanning light beam as an output of said shutter; and
- a photodetector for detecting interruption of said light beam by an article positioned in the plane and for providing a first output signal upon detecting said interruption of said light beam.

\* \* \* \* \*